US008483058B2

(12) United States Patent
Lee et al.

(10) Patent No.: US 8,483,058 B2
(45) Date of Patent: Jul. 9, 2013

(54) SYSTEMS AND METHODS FOR TRAFFIC POLICING

(75) Inventors: Kuo-Chun Lee, San Diego, CA (US);
Walid M. Hamdy, San Diego, CA (US);
Reza Shahidi, San Diego, CA (US);
Srinivasan Balasubramanian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 299 days.

(21) Appl. No.: 12/858,083

(22) Filed: Aug. 17, 2010

(65) Prior Publication Data
US 2012/0044805 A1 Feb. 23, 2012

(51) Int. Cl.
*H04L 12/24* (2006.01)
*H04W 4/00* (2009.01)

(52) U.S. Cl.
USPC ............... 370/230.1; 370/235.1; 370/329; 370/341

(58) Field of Classification Search
None
See application file for complete search history.

(56) References Cited

U.S. PATENT DOCUMENTS

| | | | |
|---|---|---|---|
| 6,950,395 B1 | 9/2005 | Bashandy et al. | |
| 7,369,489 B1 | 5/2008 | Bhattacharya et al. | |
| 2005/0169206 A1* | 8/2005 | Nozaki | 370/316 |
| 2005/0174944 A1* | 8/2005 | Legault et al. | 370/235.1 |
| 2008/0095184 A1* | 4/2008 | Yashima et al. | 370/450 |
| 2009/0086705 A1 | 4/2009 | Zisimopoulos et al. | |
| 2010/0046368 A1* | 2/2010 | Kaempfer et al. | 370/231 |

FOREIGN PATENT DOCUMENTS

| | | |
|---|---|---|
| WO | 2008112233 A2 | 9/2008 |
| WO | 2009097273 A1 | 8/2009 |

OTHER PUBLICATIONS

International Search Report and Written Opinion—PCT/US2011/048161—ISA/EPO—Jul. 4, 2012.
"LTE; Evolved Universal Terrestrial Radio Access (E-UTRA); Medium Access Control (MAC) protocol specification (3GPP TS 36.321 version 9.3.0 Release 9)", Technical Specification, European Telecommunications Standards Institute (ETSI), 650, Route Des Lucioles; F-06921 Sophia-Anti Polis; France, vol. 3GPP RAN 2, No. V9.3.0, Jul. 1, 2010, XP014047468, paragraph [05.1]-paragraph [5.1 5] paragraph [5.4.5].
NEXTWAVE: "Signalling of AMBR and applicability to scheduling and UL rate control", 3GPP Draft; S2-082354 AMBR PER PDN, 3rd Generation Partnership Project (3GPP), Mobile Competence Centre; 650, Route Des Lucioles; F-06921 Sophia-Antipolis Cedex; France, vol. SA WG2, No. Jeju, Apr. 1, 2008, XP050264691, [retrieved on Apr. 1, 2008].
Partial International Search Report—PCT/US2011/048161—ISA/EPO—Oct. 24, 2011.

\* cited by examiner

*Primary Examiner* — Chi Pham
*Assistant Examiner* — Soon-Dong D Hyun
(74) *Attorney, Agent, or Firm* — Kam T. Tam

(57) ABSTRACT

Systems and methods for policing traffic in communications systems are described herein. According to systems and methods herein, tokens are generated for a packet data network based on a peak transmission rate associated with the packet data network. Packets are selected for transmission over the packet data network based on availability of tokens.

32 Claims, 11 Drawing Sheets

SYSTEMS AND METHODS FOR TRAFFIC POLICING

BACKGROUND

1. Field

The present application relates generally to traffic policing, and more specifically to systems and methods for policing uplink traffic in Long Term Evolution (LTE) Evolved Universal Terrestrial Radio Access (E-UTRA) systems.

2. Background

Wireless communication systems are widely deployed to provide various types of communication (e.g., voice, data, multimedia services, etc.) to multiple users. Further, such communications may be provided over a plurality of bearers (e.g., Evolved Packet System (EPS) bearers). Some of these bearers may be non-guaranteed bit rate (non-GBR) bearers. Such non-GBR bearers are subject to traffic policing that limits the total bandwidth that the non-GBR bearers can utilize for communications. Accordingly, it is desirable to have a scheme for policing traffic for non-GBR bearers.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include systems and method for traffic policing.

One embodiment of the disclosure provides a wireless terminal operative in a communications network. The terminal comprises a transceiver configured to communicate with a first packet data network over a first communication channel. The terminal further comprises a processor coupled to the transceiver. The processor is configured to generate data representative of a number of tokens for the first packet data network based on a peak transmission rate associated with the first packet data network. The processor is further configured to wait until the number of tokens for the first packet data network is sufficient to transmit a first data packet to the first packet data network. The processor is further configured to select the first data packet for transmission to the first packet data network. The processor is further configured to adjust the data representative of the number of tokens for the first packet data network based on a size of the first data packet.

Another embodiment of the disclosure provides a communication node operative in a communications network. The node comprises a transceiver configured to communicate with a wireless device over a plurality of non-guaranteed bit rate bearers. The node further comprises a processor coupled to the transceiver. The processor is configured to group the plurality of non-guaranteed bit rate bearers into a logical channel group consisting of only non guaranteed bit rate bearers. The processor is further configured to receive a transmission request for the logical channel group. The processor is further configured to schedule transmission from the wireless device over the plurality of non-guaranteed bit rate bearers based at least in part on the transmission request and a peak transmission data rate associated with the wireless device.

Yet another embodiment of the disclosure provides a method for policing traffic in a communications network. The method comprises generating data representative of a number of tokens for a first packet data network based on a peak transmission rate associated with the first packet data network. The method further comprises waiting until the number of tokens for the first packet data network is sufficient to transmit a first data packet to the first packet data network. The method further comprises selecting the first data packet for transmission to the first packet data network. The method further comprises adjusting the data representative of the number of tokens for the first packet data network based on a size of the first data packet.

Yet another embodiment of the disclosure provides a method for policing traffic in a communications network. The method comprises communicating with a wireless device over a plurality of non-guaranteed bit rate bearers. The method further comprises grouping the plurality of non-guaranteed bit rate bearers into a logical channel group consisting of only non guaranteed bit rate bearers. The method further comprises receiving a transmission request for the logical channel group. The method further comprises scheduling transmission from the wireless device over the plurality of non-guaranteed bit rate bearers based at least in part on the transmission request and a peak transmission data rate associated with the wireless device.

Yet another embodiment of the disclosure provides a wireless terminal operative in a communications network. The terminal comprises means for generating data representative of a number of tokens for a first packet data network based on a peak transmission rate associated with the first packet data network. The terminal further comprises means for waiting until the number of tokens for the first packet data network is sufficient to transmit a first data packet to the first packet data network. The terminal further comprises means for selecting the first data packet for transmission to the first packet data network. The terminal further comprises means for adjusting the data representative of the number of tokens for the first packet data network based on a size of the first data packet.

Yet another embodiment of the disclosure provides a communication node operative in a communications network. The node comprises means for communicating with a wireless device over a plurality of non-guaranteed bit rate bearers. The node further comprises means for grouping the plurality of non-guaranteed bit rate bearers into a logical channel group consisting of only non guaranteed bit rate bearers. The node further comprises means for receiving a transmission request for the logical channel group. The node further comprises means for scheduling transmission from the wireless device over the plurality of non-guaranteed bit rate bearers based at least in part on the transmission request and a peak transmission data rate associated with the wireless device.

Yet another embodiment of the disclosure provides a computer program product, comprising computer-readable medium. The computer-readable medium comprises code for causing a computer to generate data representative of a number of tokens for a first packet data network based on a peak transmission rate associated with the first packet data network. The computer-readable medium further comprises code for causing a computer to wait until the number of tokens for the first packet data network is sufficient to transmit a first data packet to the first packet data network. The computer-readable medium further comprises code for causing a computer to select the first data packet for transmission to the first packet data network. The computer-readable medium further comprises code for causing a computer to adjust the data representative of the number of tokens for the first packet data network based on a size of the first data packet.

Yet another embodiment of the disclosure provides a computer program product, comprising computer-readable medium. The computer-readable medium comprises code for causing a computer to communicate with a wireless device over a plurality of non-guaranteed bit rate bearers. The computer-readable medium further comprises code for causing a computer to group the plurality of non-guaranteed bit rate bearers into a logical channel group consisting of only non guaranteed bit rate bearers. The computer-readable medium further comprises code for causing a computer to receive a transmission request for the logical channel group. The computer-readable medium further comprises code for causing a computer to schedule transmission from the wireless device over the plurality of non-guaranteed bit rate bearers based at least in part on the transmission request and a peak transmission data rate associated with the wireless device.

DETAILED DESCRIPTION

Figure 1:
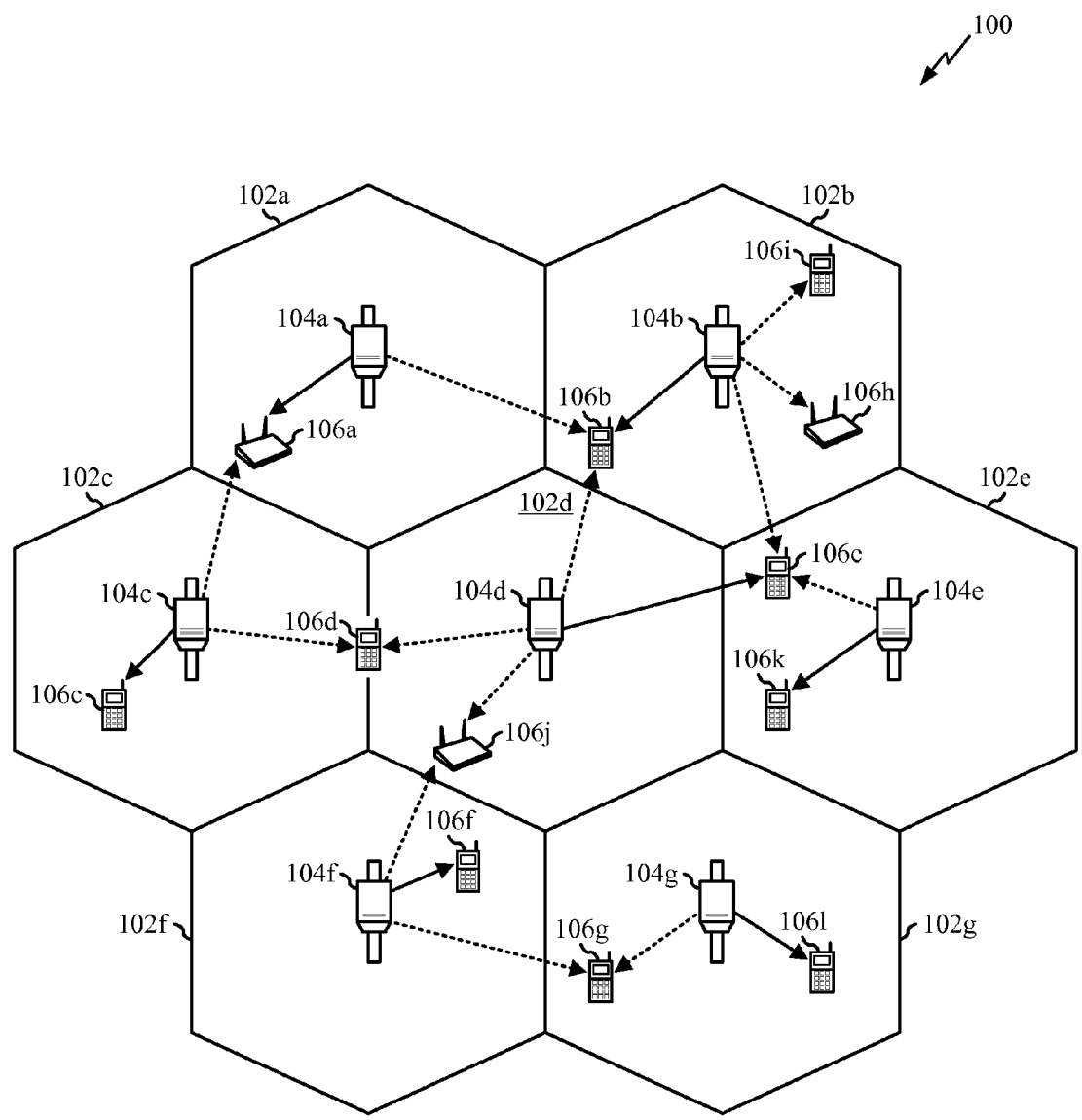
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Furthermore, in the following description, for reasons of conciseness and clarity, terminology associated with the Long Term Evolution (LTE) Evolved Universal Terrestrial Radio Access (E-UTRA) systems is used. The LTE E-UTRA technology is further described in the 3GPP TS 23.401: GPRS Enhancements for E-UTRAN Access (Release 8), which is hereby incorporated by reference in its entirety. It should be emphasized that the invention may also be applicable to other technologies, such as technologies and the associated standards related to Wideband Code Division Multiple Access (WCDMA), Time Division Multiple Access (TDMA), Orthogonal Frequency Division Multiple Access (OFDMA), Evolved High Rate Packet Data (eHRPD) and so forth. Terminologies associated with different technologies can vary. For example, depending on the technology considered, the User Equipment (UE) used in LTE can sometimes be called a mobile station, a user terminal, a subscriber unit, an access terminal, etc., to name just a few. Likewise, the Serving Gateway (SGW) used in LTE can sometimes be called a gateway, a HRPD serving gateway, and so forth. Likewise, the evolved Node B (eNB) used in LTE can sometimes be called an access node, an access point, a base station, a Node B, HRPD base station (BTS), and so forth. It should be noted here that different terminologies apply to different technologies when applicable.

A UE may form multiple connections, such as packed data network (PDN) connections, each associated with the access point name (APN), with a SGW and a packet data network gateway (PGW) to access various application servers running on a communication network. Each connection may be to a different network, such as a Voice Over Internet Protocol (VoIP), the Internet, etc. which is identified by the access point name (APN). Further, the UE may set up one or more evolved packet system (EPS) bearers for each connection, where the EPS bearer corresponds to a logical channel or data radio bearer.

Each EPS bearer may be associated with a particular service (e.g., conversational voice, conversational video, real time gaming, non-conversational video, IP multimedia subsystem (IMS) signaling, etc.). Each EPS bearer is either a guaranteed bit rate (GBR) bearer or a non-guaranteed bit rate (non-GBR) bearer. Each GBR bearer is associated with a maximum bit rate (MBR), which is the maximum bandwidth allocated to that bearer, and a GBR, which is the minimum bit rate allocated to that bearer. Accordingly, bandwidth allocation for each GBR bearer is well defined. However, non-GBR bearers are not associated with a minimum bit rate or a maximum bit rate allocated for a given non-GBR bearer. Rather, non-GBR bearers collectively are subject to a per-UE aggregate maximum bit rate (UE-AMBR) and per-APN AMBR (APN-AMBR). Accordingly, there is a maximum bit rate for communication of data over all of the non-GBR bearers of the UE. Further, there is a maximum bit rate for communication for communication of data over all of the non-GBR bearers of a given PDN connection of the UE. The APN-AMBR may be sent to the UE from an eNB as an APN-AMBR information element (IE) in a non-access stratum (NAS) message ACTIVATE DEFAULT EPS BEARER CONTEXT REQUEST during initial attachment of the UE to a network element or a new PDN connectivity request. If there is a change of the APN-AMBR, the network can send the new APN-AMBR IE in a MODIFY EPS BEARER CONTEXT REQUEST message to the UE via the eNB. Systems and methods of traffic policing of the non-GBR bearers are necessary to ensure enforcement of UE-AMBR and APN-AMBRs and are described below. Such systems and methods may be used, for example, to enforce uplink (UL) communication from the UE to an eNB.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more eNBs 104, such as, for example, eNBs 104a-104g. Each eNB 104 may provide communication coverage to a corresponding cell 102. The eNBs 104 may interact with a plurality of UEs, such as, for example, UEs 106a-106l.

Each UE 106 may communicate with one or more eNBs 104 on a forward link (FL) and/or a reverse link (RL) at a given moment. A FL is a communication link from an eNB to an UE. A RL is a communication link from an UE to an eNB. The FL may also be referred to as the downlink (DL). Further, the RL may also be referred to as the uplink (UL). The eNBs 104 may be interconnected, for example, by appropriate wired or wireless interfaces and may be able to communicate with each other. Accordingly, each UE 106 may communicate with another UE 106 through one or more eNBs 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, an eNB 104a may provide UE 106a access within its coverage area to another communications network, such as, for example the internet or another cellular network.

An UE 106a may be a wireless communication device (e.g., a mobile phone, router, personal computer, server, etc.) used by a user to send and receive voice or data over a communications network. As shown, UEs 106a, 106h, and 106j comprise routers. UEs 106b-106g, 106i, 106k, and 106l comprise mobile phones. However, each of UEs 106a-106l may comprise any suitable communication device.

Figure 2:
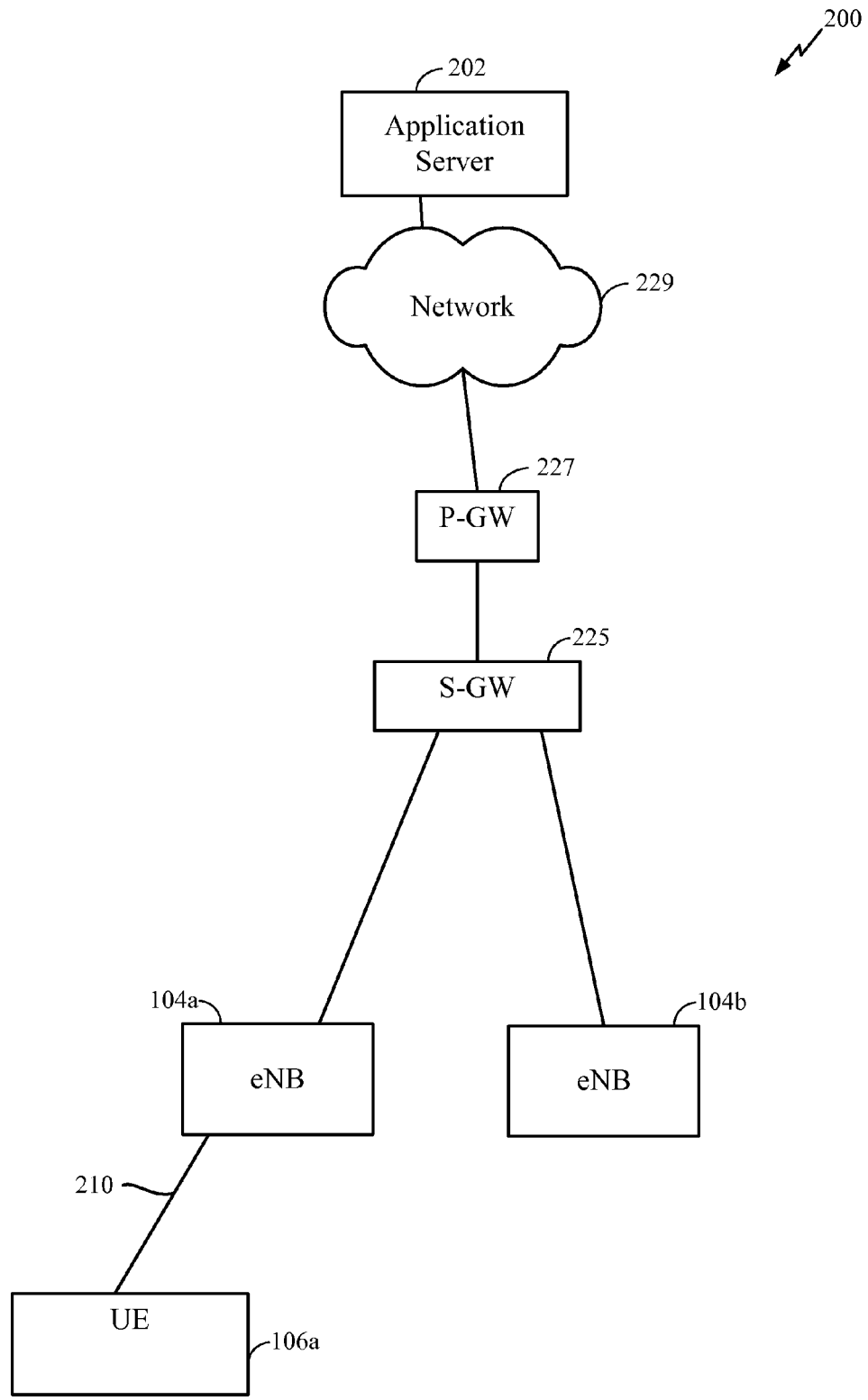
FIG. 2 is a functional block diagram of certain communication devices of the communication network of FIG. 1.

FIG. 2 is a functional block diagram of certain communication devices of the communication network of FIG. 1. It may be desirable for an UE 106a to receive data (e.g., data packets for a web browsing session, data packets for a Voice Over IP (VoIP) call, data packets for a video stream, or other data or media content) from one or more data sources such as application server 202 (e.g., a server controlled by a content provider, such as, internet websites provided by CNN®, YAHOO!®, etc.). FIG. 2 illustrates an exemplary embodiment in which the UE 106a may communicate with the application server 202 to receive information.

The UE 106a may send a request seeking data from the application server 202 to the eNB 104a. The UE 106a may establish a communication link with the eNB 104a. The communication link 210 may be an appropriate wireless link, such as, an airlink. The UE 106a may send the request to the eNB 104a via the communication link 210.

The eNB 104a may receive from the UE 106a the request seeking data from the application server 202. The eNB 104a may facilitate communication between the UE 106a and the application server 202 by sending the request for data to a SGW 225. The eNB 104a and the SGW 225 may be coupled by one or more appropriate wired links (e.g., fiber optic cable, copper cable, etc.) and/or wireless links (e.g., airlinks). The SGW 225 may further communicate with one or more additional eNBs (e.g., eNB 104b) via one or more additional wired links.

The SGW 225 may receive from the eNB 104a the sent request seeking data from the application server 202. The SGW 225 may facilitate communication between the UE 106a and the application server 202 by sending the request for data to the appropriate gateway (e.g., PGW 227).

The SGW 225 may be coupled to PGW 227 by one or more appropriate wired links (e.g., fiber optic cable, copper cable, etc.) and/or wireless links (e.g., airlinks). The SGW 225 may be coupled to a plurality of PGWs, each PGW being associated with one or more networks (e.g., PDN networks). The PGW 227 may be associated with the network 229 where the application server 202 is located. As discussed above, the network 229 may have associated with it an access point name (APN), unique to the network 229. The P-GW 227 may be directly coupled to the server 202 or may be indirectly connected through another device. Accordingly, the SGW 225 may determine which PGW to send the request for data to, based on the destination of the request. For example, the SGW 225 sends the request seeking data from the application server 202 to the PGW 227, so that the request reaches the application server 202. The PGW 227 then sends the request to the application server 202 via the network 229.

The network 229 may receive from the PGW 227 the request seeking data from the application server 202. The network 229 may facilitate communication between the UE 106a and the application server 202 by sending the request for data to the application server 202 via an appropriate wired or wireless link. The network 229 may comprise, for example, an intranet or a part of the Internet. In one embodiment, the network 229 operates pursuant to the internet protocol (IP) as promulgated by the Internet Engineering Task Force (IETF). The network may be in communication with one or more additional application servers (not shown).

The application server 202 may receive from the network 229 the request for data. The application server 202 may comprise a server connected to the network 229. The application server 202 may serve data content such as video streams to devices that access the network 229. The UE 106a may access the application server 202 to retrieve video streams or other data as described above. Accordingly, the application server 202 may process the received request and transmit the requested data to the UE 106a via the network 229, the PGW 227, the SGW 225, and the eNB 104a.

As discussed above, in LTE, for the UE 106a to communicate with the application server 202, the UE 106a may need to set up a PDN connection with the application server 202. The UE 106a may set up a PDN connection with each data source that the UE 106a communicates. The PDN connection may be a logical connection between the application server 202 and the UE 106a that corresponds to one or more physical connections required for the UE 106a and the application server 202 to communicate. Further, the UE 106a may set up multiple EPS bearers for each PDN connection.

Figure 3:
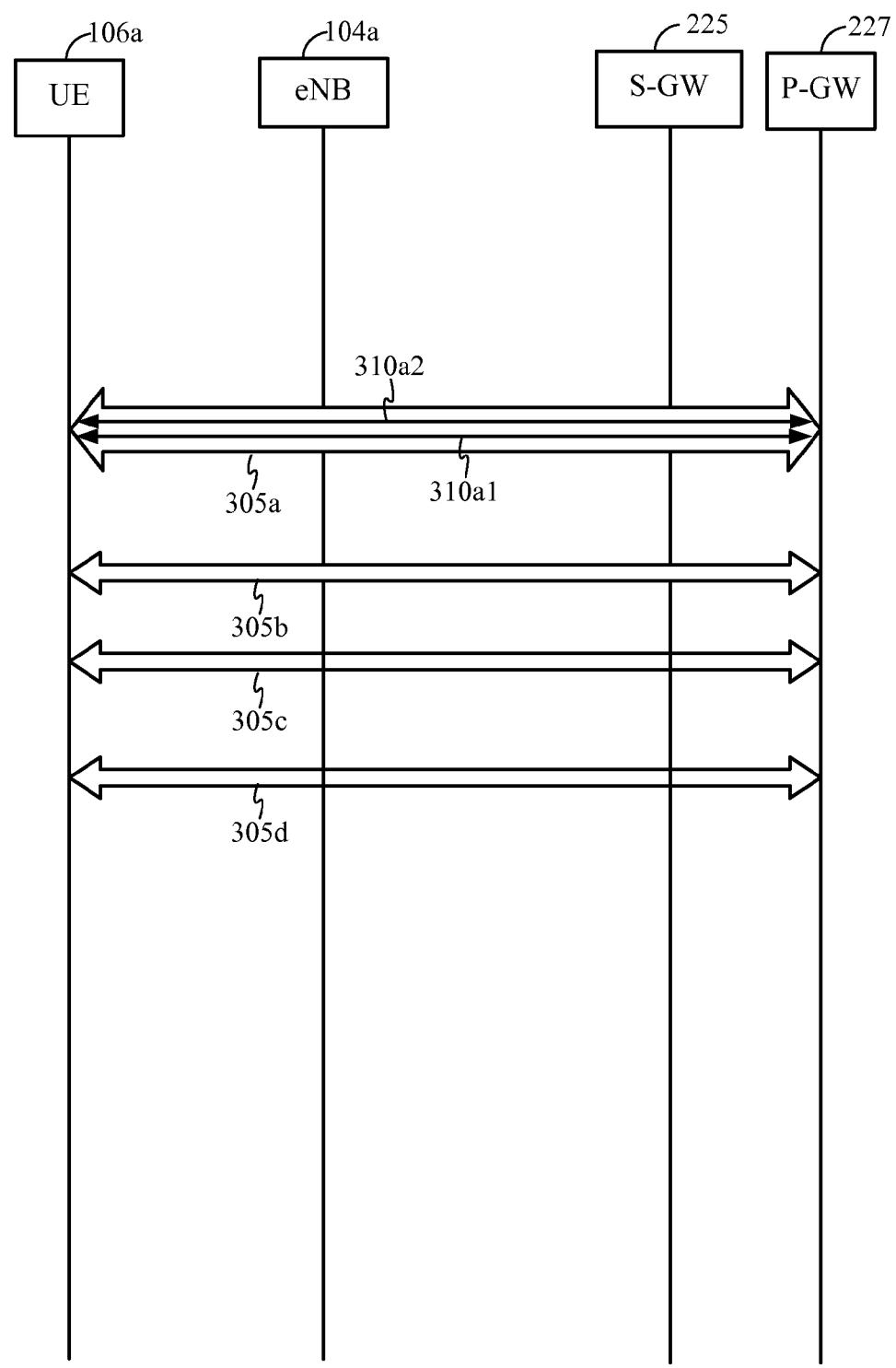
FIG. 3 is an exemplary diagram illustrating connections between a user equipment (UE) and an application server of FIG. 2.

FIG. 3 is an exemplary diagram illustrating connections between a user equipment (UE) and an application server of FIG. 2. The UE 106a, the eNB 104a, the SGW 225, and the PGW 227 are shown horizontally at the top of the figure. The connections between apparatuses is shown with directional arrows. As shown, the UE 106a has a plurality of PDN connections 305a-305d set up with the PGW 227. Further, the connections comprise one or more EPS bearers. For example, PDN connection 305a comprises EPS bearers 310a1-310a2. The UE 106a may communicate with one or more servers (e.g., server 202) via the EPS bearers of the connections 305a-305d. The communications may be policed as discussed below.

Figure 4:
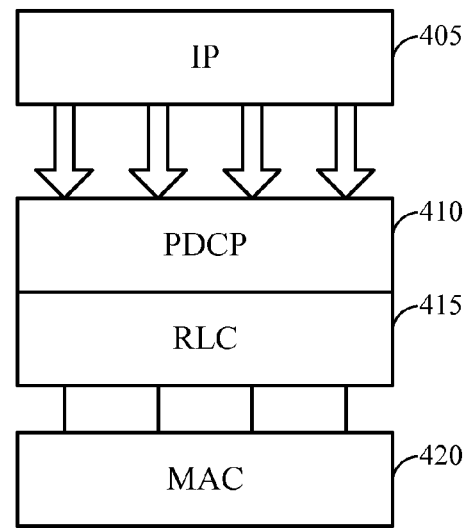
FIG. 4 illustrates a communications stack of a UE of FIG. 2.

FIG. 4 illustrates a communications stack of a UE of FIG. 2. In an LTE system, before the UE 106a can transmit data to the network via the eNB 104a, the UE 106a must request to send data. Applications running on the UE 106a may generate data to send to other entities such as the server 202. The applications may send the data to an IP layer 405 to be formatted for transmission to the eNB 104a. The IP layer may further send the data to a packet data convergence protocol (PDCP) layer 410, which further formats the data and sends the data to a radio link control (RLC) layer 415. The RLC layer 415 further formats the data and send the data to a media access control (MAC) layer 420. The MAC layer 420 may perform final formatting of the data before transmission to the eNB 104a. Further, the MAC layer 420 may buffer the data to be transmitted to the eNB 104a and negotiate with the eNB 104a to secure permission to transmit the data. The MAC layer 420 may buffer the data until permission is secured. The MAC layer 420 may generate a buffer status report (BSR) to send to the eNB 104a, which gives the status of the buffer to the eNB 104a. Using the BSR, the eNB 104a may generate a transmission schedule for the UE 106a. The eNB 104a may send the transmission schedule to the UE 106a, which then uses the transmission schedule to schedule transmission of the data to the eNB 104a.

As discussed above, data to be sent from the UE 106a to the eNB 104a over non-GBR bearers needs to meet certain parameters including a UE-AMBR and APN-AMBRs. One method of policing the transmission is to throttle the flow of data from the IP layer 405 to the MAC layer 420. Accordingly, the passing of data from the IP layer 405 to the PDCP layer 410 is controlled as discussed below with respect to FIG. 5.

Figure 5:
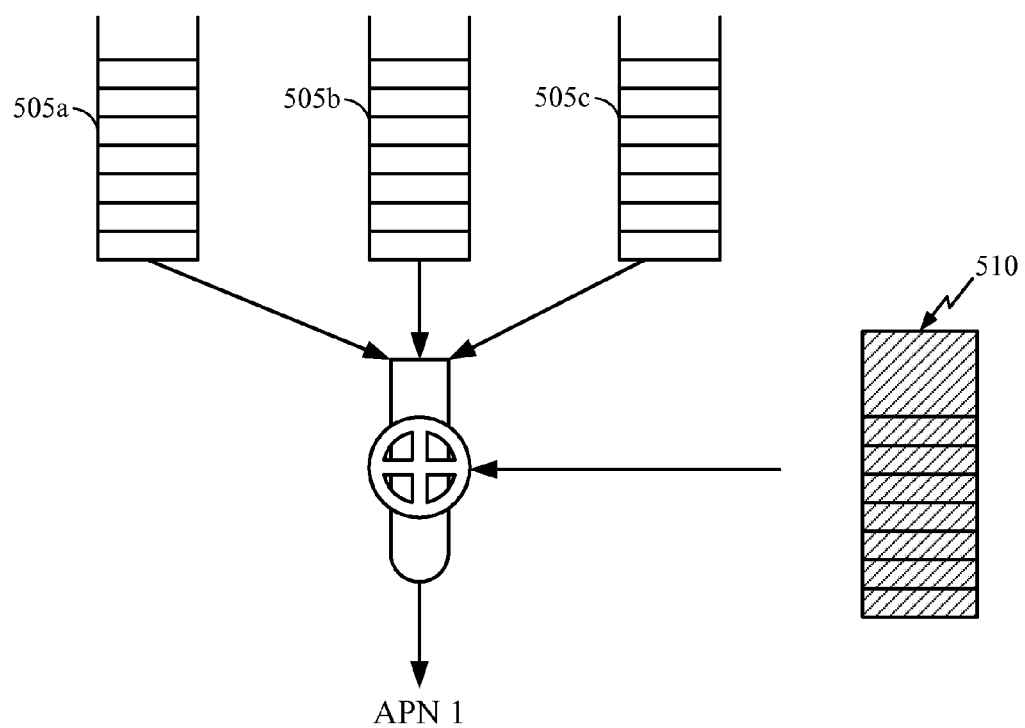
FIG. 5 illustrates a representation of a system for policing uplink traffic from a UE to an eNB of FIG. 2.

FIG. 5 illustrates a representation of a system for policing uplink traffic from a UE to an eNB of FIG. 2. APN-AMBR can be policed as follows. The IP layer 405 provides uplink packet filters that map data packets from applications to a particular EPS bearer. For example, the IP layer 405 maps data packets from applications to non-GBR bearers of a particular connection. Each non-GBR bearer of a given connection is associated with a packet buffer (e.g., a queue, stack, etc.). For example, a connection APN1 may have three non-GBR bearers 1-3, where each non-GBR bearer 1-3 is associated with a buffer 505a-505c, respectively. In another embodiment, all of the non-GBR bearers 1-3 may share a single buffer, or one or more non-GBR bearers may share a buffer (e.g., non-GBR bearers 1-2 share a buffer and non-GBR bearer 3 is associated with its own buffer). The buffers 505a-505c store packet data from applications to be sent over non-GBR bearers 1-3, respectively, to the eNB 104a. As discussed above, the APN-AMBR is a maximum bit rate for sending data over non-GBR bearers of a given connection. Accordingly, the APN-AMBR of the connection APN1 is the AMBR for sending data over non-GBR bearers 1-3 collectively.

The connection APN1 is further associated with a single token bucket 510. The token bucket 510 is used to police the traffic over APN1. A token generator generates tokens for the token bucket 510. The token bucket may be, for example, a variable, integer, data structure, etc., that reflects a number of bits. The token generator may be, for example, a function that adjusts the integer or data structure to reflect a new number of bits. The generation of tokens for the token bucket 510 is based on the APN-AMBR of connection APN1. For example, the APN-AMBR may be in units of kilobits per second (kbps). Accordingly, the token generator may generate N*1000 tokens ever T seconds, where N/T equals the APN-AMBR and a token corresponds to a single bit. In one embodiment, T=0.01 seconds. One of ordinary skill in the art will recognize that a token can refer to a different number of bits and that N and T and the relationship of N and T with respect to the APN-AMBR can be set accordingly. In one embodiment, the token bucket 510 has a maximum number of tokens. Accordingly, when the token bucket 510 reaches the maximum number of tokens, the token generator stops generating tokens until the number of tokens in the token bucket 510 is reduced. The token bucket 510 may be initially set so it contains the maximum number of tokens. If there are a number of connections, N may be an array N(j) with one element of the array corresponding to one connection. Further, there may be a different token generator for each element of the array N(j) depending on the APN-AMBR associated with the connection.

A given IP packet from one of buffers 505a-505c is sent only when there are enough tokens in the token bucket 510. For example, a given IP packet in the buffer 505a may have a size of X bits. Accordingly, the IP packet in the buffer 505a may only be sent from the IP layer 405 to the PDCP layer 410 if there are at least X bits in the token bucket 510. When an IP packet in one of the buffers 505a-505c is sent to the PDCP layer 410, the number of tokens in the token bucket 510 is decreased by the size of the IP packet sent (e.g., X). Accordingly, the flow of packet data for the non-GBR bearer 1 which is associated with the buffer 505a, is limited by the number of tokens in the token bucket 510, and accordingly, the rate at which tokens are generated for the token bucket 510. Further, as discussed above, the token bucket 510 is shared by the buffers 505a-505c. Accordingly, the flow of packet data for all of the non-GBR bearers 1-3 is controlled by the rate at which tokens are generated for the token bucket 510, which is based on the APN-AMBR of the APN1. Thus, the flow of packet data for all of the non-GBR bearers 1-3 of the APN1 is appropriately limited to the APN-AMBR of the APN1. Further, since the token bucket 510 has a maximum size, the number of tokens available for a time period T is limited, thus preventing large amounts of data from being sent over the APN1 over a short period of time that may violate the APN-AMBR and exceed the bandwidth available to the connection APN1.

The system for policing uplink traffic described with respect to FIG. 5 is further configured to select IP packets to send from the IP layer 405 to the PDCP layer 410 from among the non-GBR bearers associated with a given connection. For example, in the embodiment where there is a single buffer (e.g., buffer 505*a*) associated with all the non-GBR bearers (e.g., non-GBR bearers 1-3), the IP packets may be selected in the order in which they arrived in the buffer (e.g., first-in-first-out, last-in-first-out, etc.).

In an embodiment where there are multiple buffers (e.g., buffers 505*a*-505*c*) for the non-GBR bearers (e.g., non-GBR bearers 1-3), the system may be configured to prioritize the non-GBR bearers, and select IP packets based on the priority of the non-GBR bearers. For example, each EPS bearer may be associated with a priority ranking. The priority ranking of the EPS bearer may be based on a quality of service (QoS) class identifier (QCI) associated with the EPS bearer. For example, each GBR bearer and each non-GBR bearer may be associated with one of 9 QCI (1-9). The QCI of each EPS bearer may have the following properties according to Table 1.

TABLE 1

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

As shown, each QCI has a particular priority ranking. Accordingly, packets may be selected from multiple buffers 505*a*-505*c* on the basis of which buffer is associated with a higher ranked non-GBR bearer. For example, non-GBR bearers 1-3 may have QCI 6, 7, and 8, respectively. Accordingly, if any packets are in the buffer 505*a* for non-GBR bearer 1, those packets are selected to be sent to from the IP layer 405 to the PDCP layer 410 before any packets are selected from buffer 505*b* and 505*c*. Further, if there are no packets in the buffer 505*a*, packets are selected from buffer 505*b* before any packets are selected from buffer 505*c*. If, for example, multiple non-GBR bearers have the same QCI (e.g., non-GBR bearers 1 and 2), the priority of packets may further be based on a MAC layer priority associated with each non-GBR bearer. The MAC layer priority, for example, is contained in a logicalChannelConfig information element (IE) of a radio resource control (RRC) message RRCConnectionReconfiguration associated with a given EPS bearer. One of ordinary skill in the art will recognize that other priority schemes similar to those described may be used for packet selection between the buffers 505*a*-505*c*.

Figure 6:
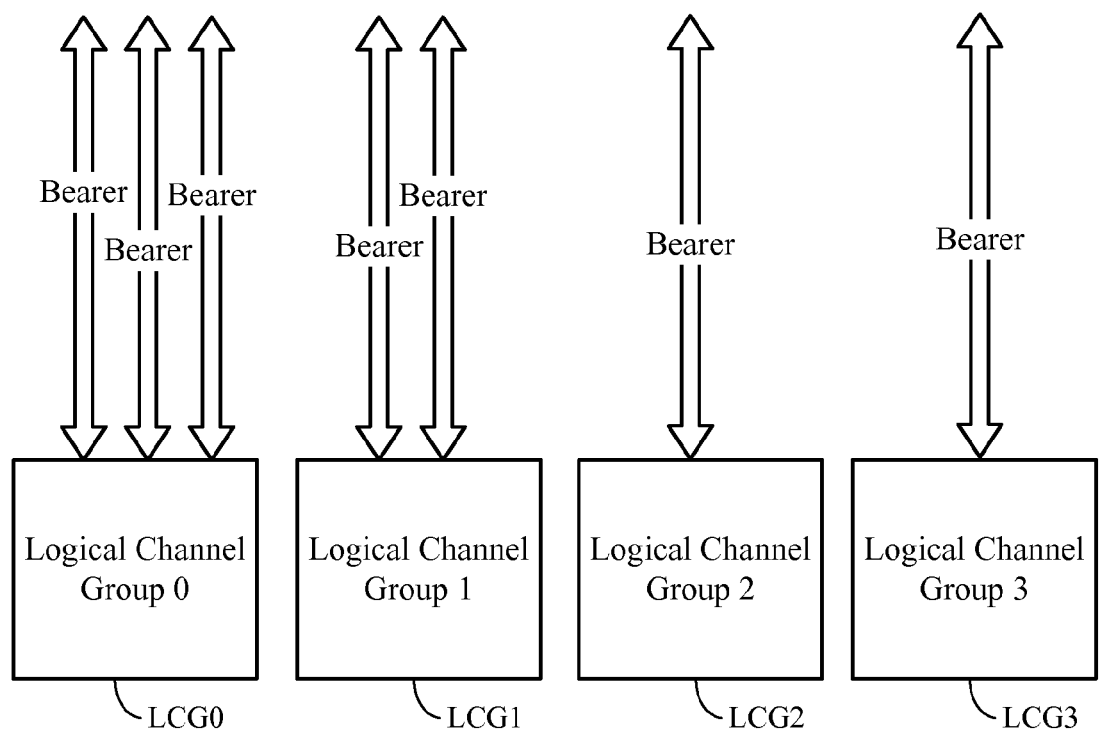
FIG. 6 illustrates a diagram of grouping of evolved packet system (EPS) bearers into logical channel groups.

FIG. 6 illustrates a diagram of grouping of EPS bearers into logical channel groups. EPS bearers associated with a UE (e.g., UE 106*a*) may be grouped into a plurality of logical channel groups (LCGs). For example, in LTE systems, four LCGs are allowed per UE. The eNB 104*a* groups EPS bearers into the LCGs. Each LCG may include one or more EPS bearers, where the EPS bearers may be non-GBR bearers and/or GBR bearers. Further, the EPS bearers of a given LCG may be associated with one or more PDN connections.

As discussed above, the MAC layer 420 of the UE 106*a* may buffer packets sent from the IP layer 405 for transmission to the eNB 104*a*. The MAC layer 420 may buffer data such that there is one buffer per LCG. The MAC layer 420 may then generate a BSR for each LCG and transmit the BSR to the eNB 104*a*. The BSR may comprise data indicative of the number of MAC layer packets in the buffer of a particular LCG. The eNB 104*a* may then determine the number of bits required to send the MAC layer packets over the EPS bearers of the LCG. For example, the MAC layer may add overhead bits when transmitting IP packets. Accordingly, the eNB 104*a* determines the number of bits required to send an IP packet including the overhead bits required to determine how many bits the UE 106*a* is requesting to send.

In order to police the rate that data is sent over non-GBR bearers from the UE 106*a* to the eNB 104*a*, the eNB 104*a* needs to be able to determine the rate at which data is sent over the non-GBR bearers from the UE 106*a*. In one embodiment, the eNB 104*a* may group all of the non-GBR EPS bearers associated with the UE 106*a* into one or more LCGs (e.g., LCG 0), wherein the one or more LCGs do not include any GBR EPS bearers. The GBR bearers may be grouped into one or more other LCGs (e.g., LCGs 1-3). Accordingly, when the eNB 104*a* receives BSRs for the one or more LCGs with only non-GBR EPS bearers, the eNB 104*a* know the amount of data the UE 106*a* requests to send to the eNB 104*a* over the aggregate of all of the non-GBR EPS bearers. Therefore, the eNB 104*a* can keep track of the number of bits sent over non-GBR EPS bearers by the UE 106*a* over time. The eNB 104*a* may schedule transmission of packets in the one or more LCGs with only non-GBR EPS bearers such that the data rate of transmission does not exceed the UE-AMBR. For example, the eNB 104*a* may schedule M bits to be transmitted every T time interval from the UE 106*a* such that the UE-AMBR is not exceeded.

In another embodiment, the eNB 104*a* may group all non-GBR EPS bearers of a given connection into a single LCG, for all of the connections that include non-GBR EPS bearers. The GBR EPS bearers may be grouped into one or more other LCGs. By receiving a BSR for a LCG including all non-GBR EPS bearers of a given connection, the eNB 104*a* can then determine the number of bits the UE 106*a* requests to send over the non-GBR EPS bearers of a given connection. The eNB 104*a* may therefore schedule transmission of packets for the LCG with only non-GBR EPS bearers of a given connection such that the data rate of transmission does not exceed the APN-AMBR for that connection. Further, by receiving the BSRs of each of the LCGs containing only non-GBR EPS bearers, the eNB 104*a* can then determine the number of bits the UE 106*a* requests to send over all of non-GBR EPS bearers of the UE 106*a*. The eNB 104*a* may therefore further schedule transmission of packets for each of the LCGs containing only non-GBR EPS bearers such that the data rate of transmission does not exceed the UE-AMBR for the UE 106a.

Figure 7:
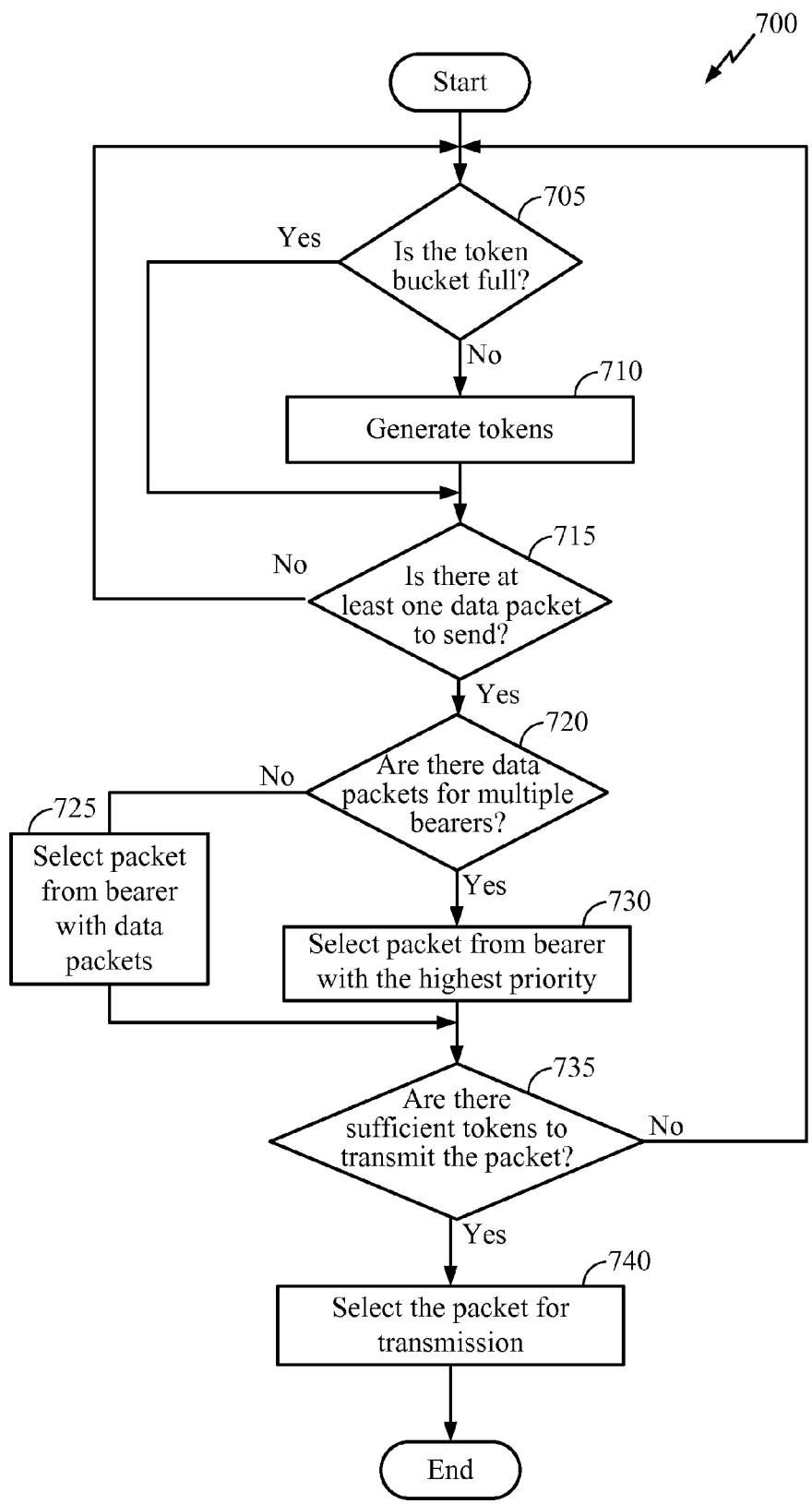
FIG. 7 is a flowchart of an exemplary process for selecting non-guaranteed bit rate (non-GBR) EPS bearer packets of a connection for transmission from a UE to an eNB of FIG. 2.

FIG. 7 is a flowchart of an exemplary process for selecting non-GBR EPS bearer packets of a PDN connection for transmission from a UE to an eNB of FIG. 2. At a first step 705, the UE 106a determines whether the token bucket 510 associated with the connection APN1 has reached a maximum number of tokens. If the UE 106a determines the token bucket 510 has reached a maximum number of tokens, the process 700 continues to a step 715. If the UE 106a determines the token bucket 510 has not reached a maximum number of tokens, the process 700 continues to a step 710. At the step 710, the token bucket generator associated with the token bucket 510 generates tokens based on an APN-AMBR associated with the connection APN1.

Continuing at a step 715, the UE 106a determines if there is at least one data packet in one of buffers 505a-505c to send to the eNB 104a. If at the step 715, the UE 106a determines there is not at least one data packet in one of buffers 505a-505c to send to the eNB 104a, the process 700 returns to the step 705. If at the step 715, the UE 106a determines there is at least one data packet in one of buffers 505a-505c to send to the eNB 104a, the process 700 continues to a step 720.

At the step 720, the UE 106a determines whether there are data packets in more than one of the buffers 505a-505c. If the UE 106a determines there are not data packets in more than one of the buffers 505a-505c, the process 700 continues to a step 725. At the step 725, the UE 106a selects the data packet from the one of the buffers 505a-505c with data packets. The process 700 then continues to a step 735.

If the UE 106a determines there are data packets in more than one of the buffers 505a-505c, the UE 106a continues to a step 730. At the step 730, the UE 106a selects the data packet from the one of the buffers 505a-505c associated with the bearer having the highest priority from among the bearers associated with buffers 505a-505c. The process 700 then continues to the step 735.

At the step 735, the UE 106a determines if there are sufficient tokens in the token bucket 510 to transmit the selected packet. If the UE 106a determines there are not sufficient tokens, the process 700 returns to step 705. If the UE 106a determines there are sufficient tokens, the process 700 continues to a step 740. At the step 740, the UE 106a selects the packet for transmission and passes the packet from the IP layer 405 to the PDCP layer 410.

Figure 8:
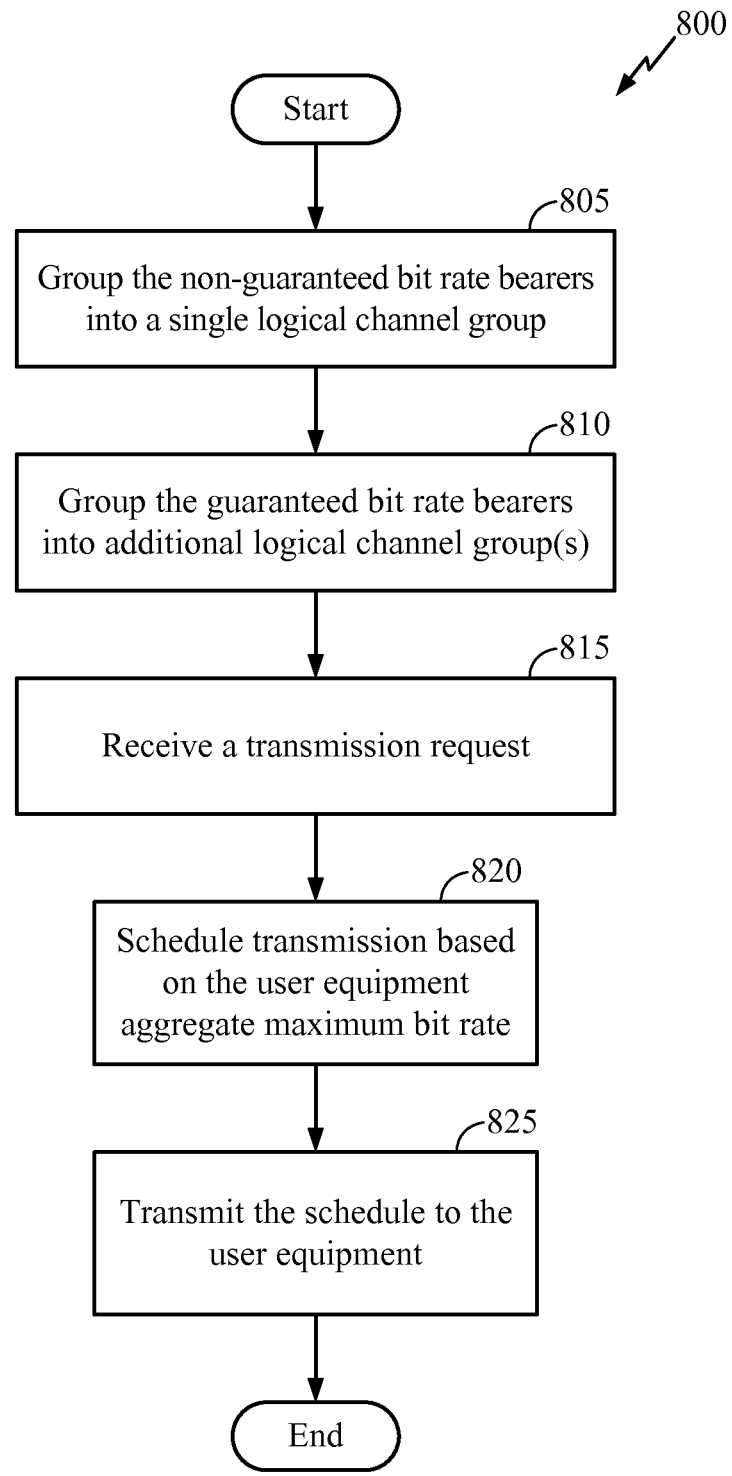
FIG. 8 is a flowchart of scheduling communication over non-GBR EPS bearers grouped into a single logical channel group of FIG. 6.

FIG. 8 is a flowchart of scheduling communication over non-GBR EPS bearers grouped into a single logical channel group of FIG. 6. At a first step 805, the eNB 104a groups all of the non-GBR EPS bearers associated with the UE 106a into a single LCG, LCG0. Continuing at a step 810, the eNB 104a groups the GBR EPS bearers into other LCGs, LCGs1-3. Further, at a step 815, the eNB 104a receives a request from the UE 106a to transmit data over one or more of the non-GBR EPS bearers in the LCG0. Next, at a step 820, the eNB 104a schedules transmission from the UE 106a to the eNB 104a over the one or more of the non-GBR EPS bearers in the LCG0 based on the UE-AMBR of the UE 106a. Further at a step 825, the UE 106a transmits the schedule to the UE 106a.

One of ordinary skill in the art should understand that processes 700 and 800 are merely illustrative. Steps of process 700 and 800 may be removed, additional steps may be added, and/or the order of steps changed, while still being consistent with the principles and novel features disclosed herein.

Figure 9:
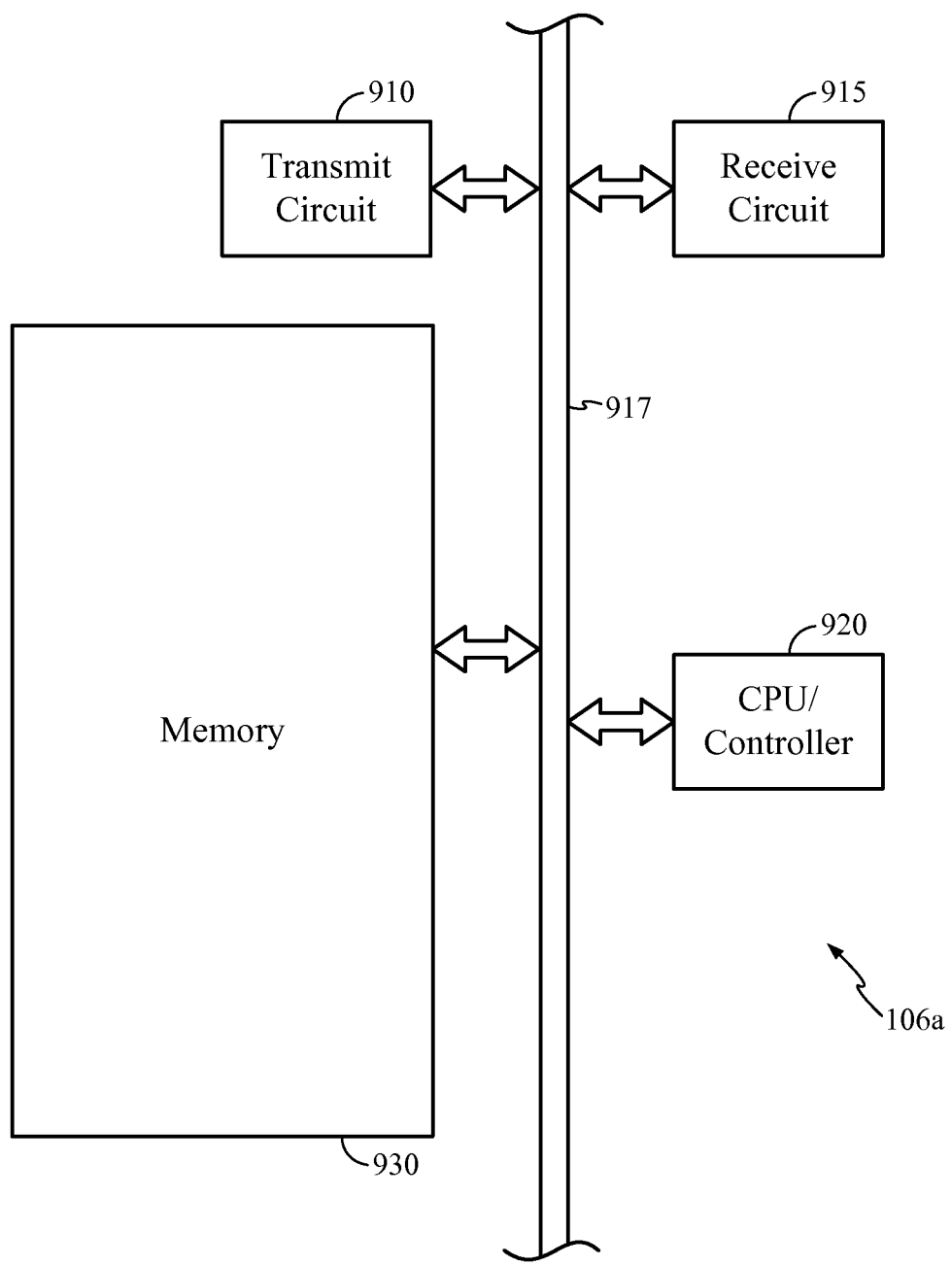
FIG. 9 is a functional block diagram of an exemplary UE shown in FIG. 2.

FIG. 9 is a functional block diagram of an exemplary user equipment 106a shown in FIG. 2. As discussed above with respect to FIG. 2, the UE 106a may communicate with the eNB 104a to receive data from the application server 202 by sending a request for data to the application server 202 via the eNB 104a. The UE 106a may comprise a transmit circuit 910 configured to transmit an outbound message, such as a request for data from the application server 202, to the eNB 104a. The UE 106a may further comprise a receive circuit 915 configured to receive an incoming message, such as a data packet from the application server 202, from the eNB 104a. The transmit circuit 910 and the receive circuit 915 may be coupled to a central processing unit (CPU)/controller 920 via a bus 917. The CPU 920 may be configured to process the inbound and outbound messages coming from or going to the eNB 104a. The CPU 920 may also be configured to control other components of the UE 106a.

The CPU 920 may further be coupled to a memory 930 via the bus 917. The CPU 920 may read information from or write information to the memory 930. For example, the memory 930 may be configured to store inbound or outbound messages before, during, or after processing and/or records of connections and connection contexts. The memory 930 may also comprise instructions or functions for execution on the CPU 920. For example, the memory 930 may comprise instructions or functions to perform the processes and methods described herein.

The transmit circuit 910 may comprise a modulator configured to modulate outbound message going to the eNB 104a. The receive circuit 915 may comprise a demodulator configured to demodulate inbound messages coming from the eNB 104a.

The memory 930 may comprise processor cache, including a multi-level hierarchical cache in which different levels have different capacities and access speeds. The memory 930 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, Zip drives, etc.

Although described separately, it is to be appreciated that functional blocks described with respect to the UE 106a need not be separate structural elements. For example, the CPU 920 and the memory 930 may be embodied on a single chip. The CPU 920 may additionally, or in the alternative, contain memory, such as processor registers. Similarly, one or more of the functional blocks or portions of the functionality of various blocks may be embodies on a single chip. Alternatively, the functionality of a particular block may be implemented on two or more chips.

One or more of the functional blocks and/or one or more combinations of the functional blocks described with respect to the UE 106a may be embodied as a general purpose processor, a digital signal processor (DSP), an application specific integrated device, discrete gate or transistor logic, discrete hardware components, circuitry or any suitable combination thereof designed to perform the functions described herein. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 9. One or more of the functional blocks and/or one or more combinations of the functional blocks described with respect to the UE 106a may also be implemented as a combination of computing devices, e.g., a combination of a DSP and a microprocessor, a plurality of microprocessors, one or more microprocessor in conjunction with a DSP communication, or any other such configuration.

Figure 10:
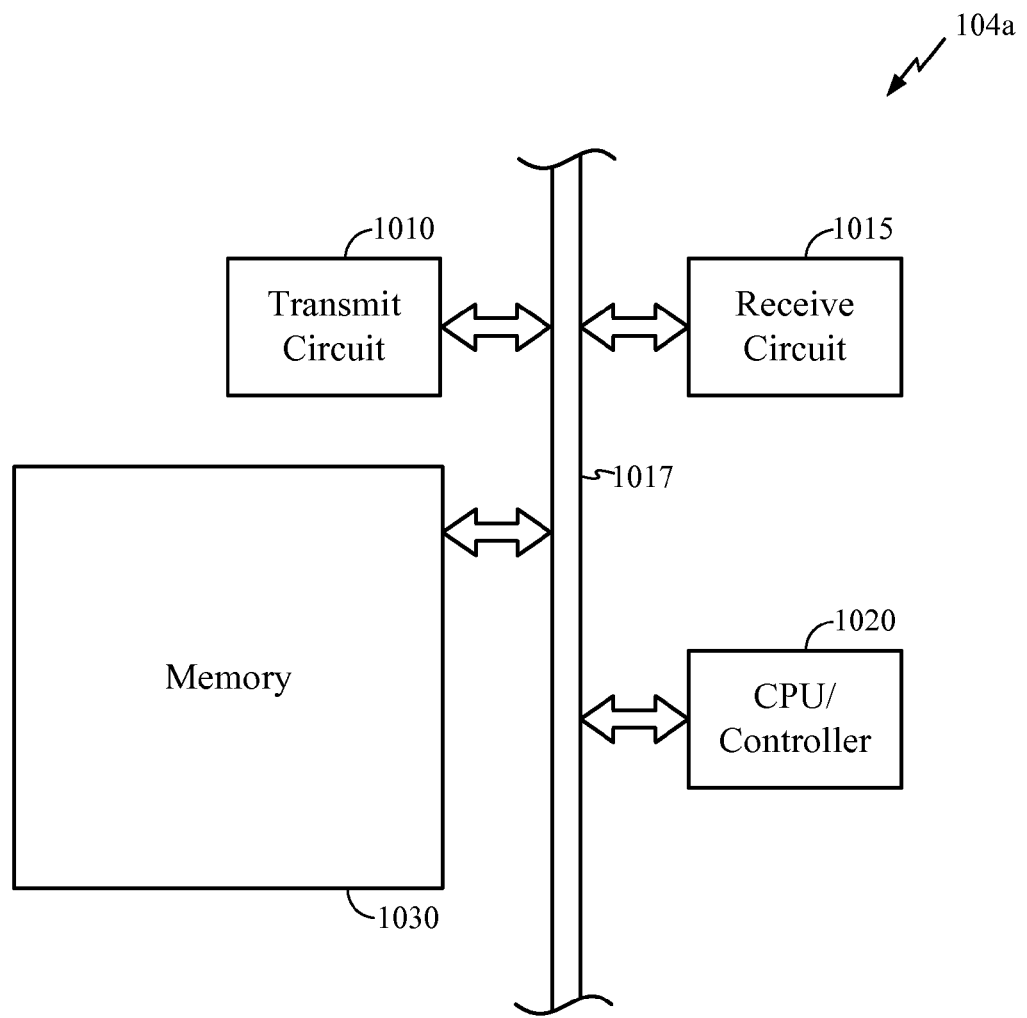
FIG. 10 is a functional block diagram of an exemplary eNB shown in FIG. 2.

FIG. 10 is a functional block diagram of an exemplary eNB 104a shown in FIG. 2. As discussed above with respect to FIG. 2, the eNB 104a may send/receive data to/from the UE 106a. Further, the eNB 104a may communicate with the SGW 225 and the PGW 227 to send/receive data to/from the application server 202 as discussed above with respect to FIG. 2. Accordingly, the eNB 104a may facilitate communication between the UE 106a and the application server 202. The eNB 104a may comprise a transmit circuit 1010 configured to transmit an outbound message, such as a request for data from the application server 202. The eNB 104a may further comprise a receive circuit 1015 configured to receive an incoming message, such as a data packet from the application server 202. The transmit circuit 1010 and the receive circuit 1015 may be coupled to a central processing unit (CPU)/controller 1020 via a bus 1017. The CPU 1020 may be configured to process the inbound and outbound messages coming from or going to the application server 202. The CPU 1020 may also be configured to control other components of the eNB 104a.

The CPU 1020 may further be coupled to a memory 1030 via the bus 1017. The CPU 1020 may read information from or write information to the memory 1030. For example, the memory 1030 may be configured to store inbound or outbound messages before, during, or after processing and/or records of connections and connection contexts. The memory 1030 may also comprise instructions or functions for execution on the CPU 120. For example, the memory 1030 may comprise instructions or functions to perform the processes and methods described herein.

The transmit circuit 1010 may comprise a modulator configured to modulate outbound messages going to the UE 106a and/or the SGW 225. The receive circuit 1015 may comprise a demodulator configured to demodulate inbound messages coming from the UE 106a and/or the SGW 225.

The memory 1030 may comprise processor cache, including a multi-level hierarchical cache in which different levels have different capacities and access speeds. The memory 1030 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, Zip drives, etc.

Although described separately, it is to be appreciated that functional blocks described with respect to the eNB 104a need not be separate structural elements. For example, the CPU 1020 and the memory 1030 may be embodied on a single chip. The CPU 1020 may additionally, or in the alternative, contain memory, such as processor registers. Similarly, one or more of the functional blocks or portions of the functionality of various blocks may be embodies on a single chip. Alternatively, the functionality of a particular block may be implemented on two or more chips.

One or more of the functional blocks and/or one or more combinations of the functional blocks described with respect to the eNB 104a may be embodied as a general purpose processor, a digital signal processor (DSP), an application specific integrated device, discrete gate or transistor logic, discrete hardware components, circuitry or any suitable combination thereof designed to perform the functions described herein. As noted above, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 10. One or more of the functional blocks and/or one or more combinations of the functional blocks described with respect to the UE 106a may also be implemented as a combination of computing devices, e.g., a combination of a DSP and a microprocessor, a plurality of microprocessors, one or more microprocessor in conjunction with a DSP communication, or any other such configuration.

The functionality described herein (e.g., with regard to one or more of the accompanying figures) may correspond in some aspects to similarly designated "means for" functionality in the appended claims. Referring to FIGS. 9-12, the UE 106a and the eNB 104a are represented as a series of interrelated functional modules.

Figure 11:
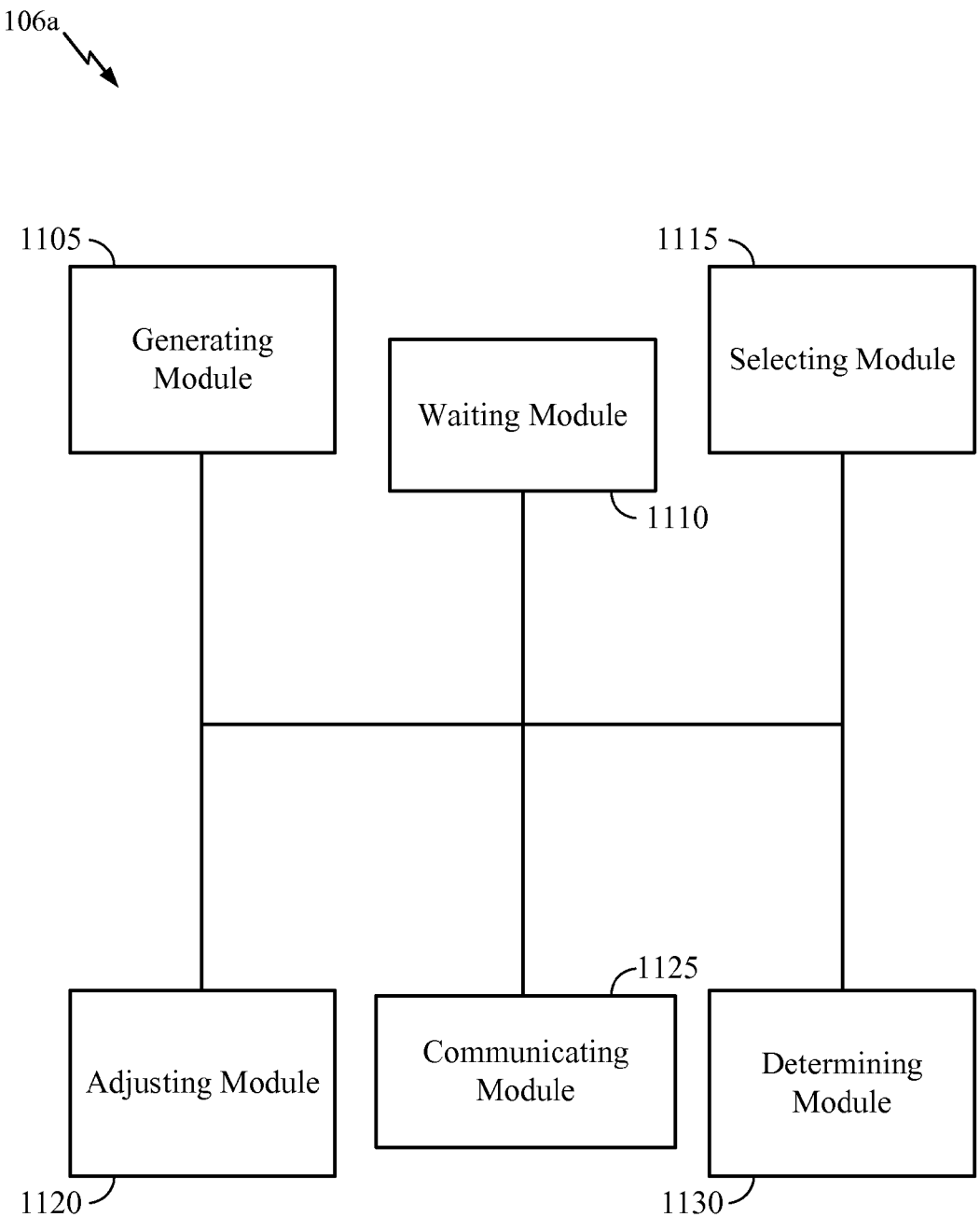
FIG. 11 is a functional block diagram of another exemplary UE in one of the communication networks of FIG. 2.

FIG. 11 is a functional block diagram of another exemplary UE in one of the communication networks of FIG. 2. As shown, the UE 106a may comprise a generating module 1105, a waiting module 1110, a selecting module 1115, an adjusting module 1120, a communicating module 1125, and a determining module 1130. The generating module 1105 may correspond at least in some aspects to, for example, a CPU and/or a memory as discussed herein. The waiting module 1110 may correspond at least in some aspects to, for example, a CPU and/or a memory as discussed herein. The selecting module 1115 may correspond at least in some aspects to, for example, a CPU and/or a memory as discussed herein. The adjusting module 1120 may correspond at least in some aspects to, for example, a CPU and/or a memory as discussed herein. The communicating module 1125 may correspond at least in some aspects to, for example, a transmit circuit and/or a receive circuit as discussed herein. The determining module 1130 may correspond at least in some aspects to, for example, a CPU and/or a memory as discussed herein.

Figure 12:
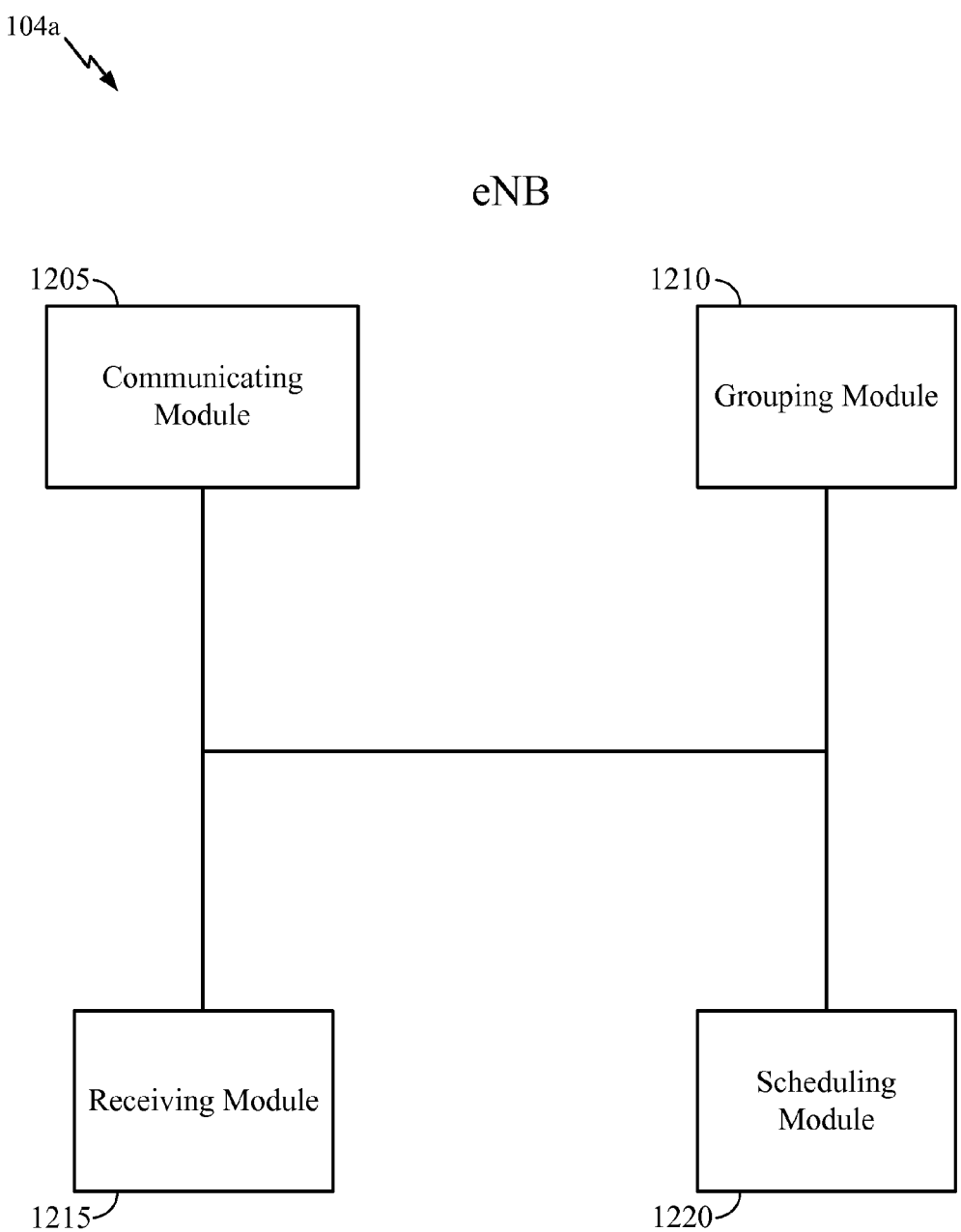
FIG. 12 is a functional block diagram of another exemplary eNB in one of the communication networks of FIG. 2.

FIG. 12 is a functional block diagram of another exemplary eNB in one of the communication networks of FIG. 2. As shown, the eNB 104a may comprise a communicating module 1205, a grouping module 1210, a receiving module 1215, and a scheduling module 1220. The communicating module 1205 may correspond at least in some aspects to, for example, a transmit circuit and/or a receive circuit as discussed herein. The grouping module 1210 may correspond at least in some aspects to, for example, a CPU and/or a memory as discussed herein. The receiving module 1215 may correspond at least in some aspects to, for example, a CPU and/or a receive circuit as discussed herein. The scheduling module 1220 may correspond at least in some aspects to, for example, a CPU and/or a memory as discussed herein.

The functionality of the modules of FIGS. 9-12 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless terminal operative in a communications network, the terminal comprising:
    a transceiver configured to communicate with a first packet data network over a first communication channel; and
    a processor coupled to the transceiver, the processor being configured to:
        generate data representative of a number of tokens for the first packet data network based on a peak transmission rate associated with the first packet data network;
        wait until the number of tokens for the first packet data network is sufficient to transmit a first data packet to the first packet data network;
        select the first data packet for transmission to the first packet data network; and
        adjust the data representative of the number of tokens for the first packet data network based on a size of the first data packet.

2. The terminal of claim 1, wherein the processor is further configured to periodically increase the number of tokens for the first packet data network.

3. The terminal of claim 2, wherein the processor is configured to stop increasing the number of tokens for the first packet data network when the number of tokens is equal to a threshold value.

4. The terminal of claim 1, wherein the transceiver is further configured to communicate with the first packet data network over a second communication channel, wherein the processor is further configured to:
    determine a priority between the first communication channel and the second communication channel; and
    select the first data packet from a plurality of data packets for transmission to the first packet data network based on the determined priority, wherein the first data packet is associated with one of the first communication channel and the second communication channel and a second data packet of the plurality of data packets is associated with a different one of the first communication channel and the second communication channel.

5. The terminal of claim 4, wherein the processor is further configured to determine the priority between the first communication channel and the second communication channel based on a quality of service class identifier (QCI) of each of the first communication channel and the second communication channel.

6. The terminal of claim 1, wherein the transceiver is further configured to communicate with a second packet data network over a second communication channel, and wherein the processor is further configured to:
generate data representative of a number of tokens for the second packet data network based on a peak transmission rate associated with the second packet data network;
wait until the number of tokens for the second packet data network is sufficient to transmit a data packet to the second packet data network;
select the data packet for transmission to the second packet data network; and
adjust the data representative of the number of tokens for the second packet data network based on a size of the data packet.

7. The terminal of claim 1, wherein the peak transmission rate comprises an access point name aggregate maximum bit rate, and wherein the first packet data network is associated with an access point name.

8. The terminal of claim 1, wherein the first communication channel comprises a bearer.

9. A method for policing traffic in a communications network, the method comprising:
generating data representative of a number of tokens for a first packet data network based on a peak transmission rate associated with the first packet data network;
waiting until the number of tokens for the first packet data network is sufficient to transmit a first data packet to the first packet data network;
selecting the first data packet for transmission to the first packet data network; and
adjusting the data representative of the number of tokens for the first packet data network based on a size of the first data packet.

10. The method of claim 9, further comprising periodically increasing the number of tokens for the first packet data network.

11. The method of claim 10, further comprising stopping increasing the number of tokens for the first packet data network when the number of tokens is equal to a threshold value.

12. The method of claim 9, further comprising:
communicating with the first packet data network over a first communication channel and a second communication channel;
determining a priority between the first communication channel and the second communication channel; and
selecting the first data packet from a plurality of data packets for transmission to the first packet data network based on the determined priority, wherein the first data packet is associated with one of the first communication channel and the second communication channel and a second data packet of the plurality of data packets is associated with a different one of the first communication channel and the second communication channel.

13. The method of claim 12, further comprising determining the priority between the first communication channel and the second communication channel based on a quality of service class identifier (QCI) of each of the first communication channel and the second communication channel.

14. The method of claim 9, further comprising:
communicating with the first packet data network over a first communication channel;
communicating with a second packet data network over a second communication channel;
generating data representative of a number of tokens for the second packet data network based on a peak transmission rate associated with the second packet data network;
waiting until the number of tokens for the second packet data network is sufficient to transmit a data packet to the second packet data network;
selecting the data packet for transmission to the second packet data network; and
adjusting the data representative of the number of tokens for the second packet data network based on a size of the data packet.

15. The method of claim 9, wherein the peak transmission rate comprises an access point name aggregate maximum bit rate, and wherein the first packet data network is associated with an access point name.

16. The method of claim 9, wherein the first communication channel comprises a bearer.

17. A wireless terminal operative in a communications network, the terminal comprising:
means for generating data representative of a number of tokens for a first packet data network based on a peak transmission rate associated with the first packet data network;
means for waiting until the number of tokens for the first packet data network is sufficient to transmit a first data packet to the first packet data network;
means for selecting the first data packet for transmission to the first packet data network; and
means for adjusting the data representative of the number of tokens for the first packet data network based on a size of the first data packet.

18. The wireless terminal of claim 17, further comprising means for periodically increasing the number of tokens for the first packet data network.

19. The wireless terminal of claim 18, further comprising means for stopping increasing the number of tokens for the first packet data network when the number of tokens is equal to a threshold value.

20. The wireless terminal of claim 17, further comprising:
means for communicating with the first packet data network over a first communication channel and a second communication channel;
means for determining a priority between the first communication channel and the second communication channel; and
means for selecting the first data packet from a plurality of data packets for transmission to the first packet data network based on the determined priority, wherein the first data packet is associated with one of the first communication channel and the second communication channel and a second data packet of the plurality of data packets is associated with a different one of the first communication channel and the second communication channel.

21. The wireless terminal of claim 20, further comprising means for determining the priority between the first communication channel and the second communication channel based on a quality of service class identifier (QCI) of each of the first communication channel and the second communication channel.

22. The wireless terminal of claim 17, further comprising:
means for communicating with the first packet data network over a first communication channel;
means for communicating with a second packet data network over a second communication channel;
means for generating data representative of a number of tokens for the second packet data network based on a peak transmission rate associated with the second packet data network;
means for waiting until the number of tokens for the second packet data network is sufficient to transmit a data packet to the second packet data network;
means for selecting the data packet for transmission to the second packet data network; and
means for adjusting the data representative of the number of tokens for the second packet data network based on a size of the data packet.

23. The wireless terminal of claim 17, wherein the peak transmission rate comprises an access point name aggregate maximum bit rate, and wherein the first packet data network is associated with an access point name.

24. The wireless terminal of claim 17, wherein the first communication channel comprises a bearer.

25. A computer program product, comprising:
a non-transitory computer-readable medium comprising:
code for causing a computer to generate data representative of a number of tokens for a first packet data network based on a peak transmission rate associated with the first packet data network;
code for causing a computer to wait until the number of tokens for the first packet data network is sufficient to transmit a first data packet to the first packet data network;
code for causing a computer to select the first data packet for transmission to the first packet data network; and
code for causing a computer to adjust the data representative of the number of tokens for the first packet data network based on a size of the first data packet.

26. The computer program product of claim 25, wherein the a non-transitory computer-readable medium further comprises code for causing a computer to periodically increase the number of tokens for the first packet data network.

27. The computer program product of claim 26, wherein the a non-transitory computer-readable medium further comprises code for causing a computer to stop increasing the number of tokens for the first packet data network when the number of tokens is equal to a threshold value.

28. The computer program product of claim 25, wherein the a non-transitory computer-readable medium further comprises:
code for causing a computer to communicate with the first packet data network over a first communication channel and a second communication channel;
code for causing a computer to determine a priority between the first communication channel and the second communication channel; and
code for causing a computer to select the first data packet from a plurality of data packets for transmission to the first packet data network based on the determined priority, wherein the first data packet is associated with one of the first communication channel and the second communication channel and a second data packet of the plurality of data packets is associated with a different one of the first communication channel and the second communication channel.

29. The computer program product of claim 28, wherein the a non-transitory computer-readable medium further comprises code for causing a computer to determine the priority between the first communication channel and the second communication channel based on a quality of service class identifier (QCI) of each of the first communication channel and the second communication channel.

30. The computer program product of claim 25, wherein the a non-transitory computer-readable medium further comprises:
code for causing a computer to communicate with the first packet data network over a first communication channel;
code for causing a computer to communicate with a second packet data network over a second communication channel;
code for causing a computer to generate data representative of a number of tokens for the second packet data network based on a peak transmission rate associated with the second packet data network;
code for causing a computer to wait until the number of tokens for the second packet data network is sufficient to transmit a data packet to the second packet data network;
code for causing a computer to select the data packet for transmission to the second packet data network; and
code for causing a computer to adjust the data representative of the number of tokens for the second packet data network based on a size of the data packet.

31. The computer program product of claim 25, wherein the peak transmission rate comprises an access point name aggregate maximum bit rate, and wherein the first packet data network is associated with an access point name.

32. The computer program product of claim 25, wherein the first communication channel comprises a bearer.

* * * * *